March 17, 1925.
M. J. ULINE
ICE SCORING MACHINE
Filed April 4, 1921
1,529,972
3 Sheets-Sheet 1
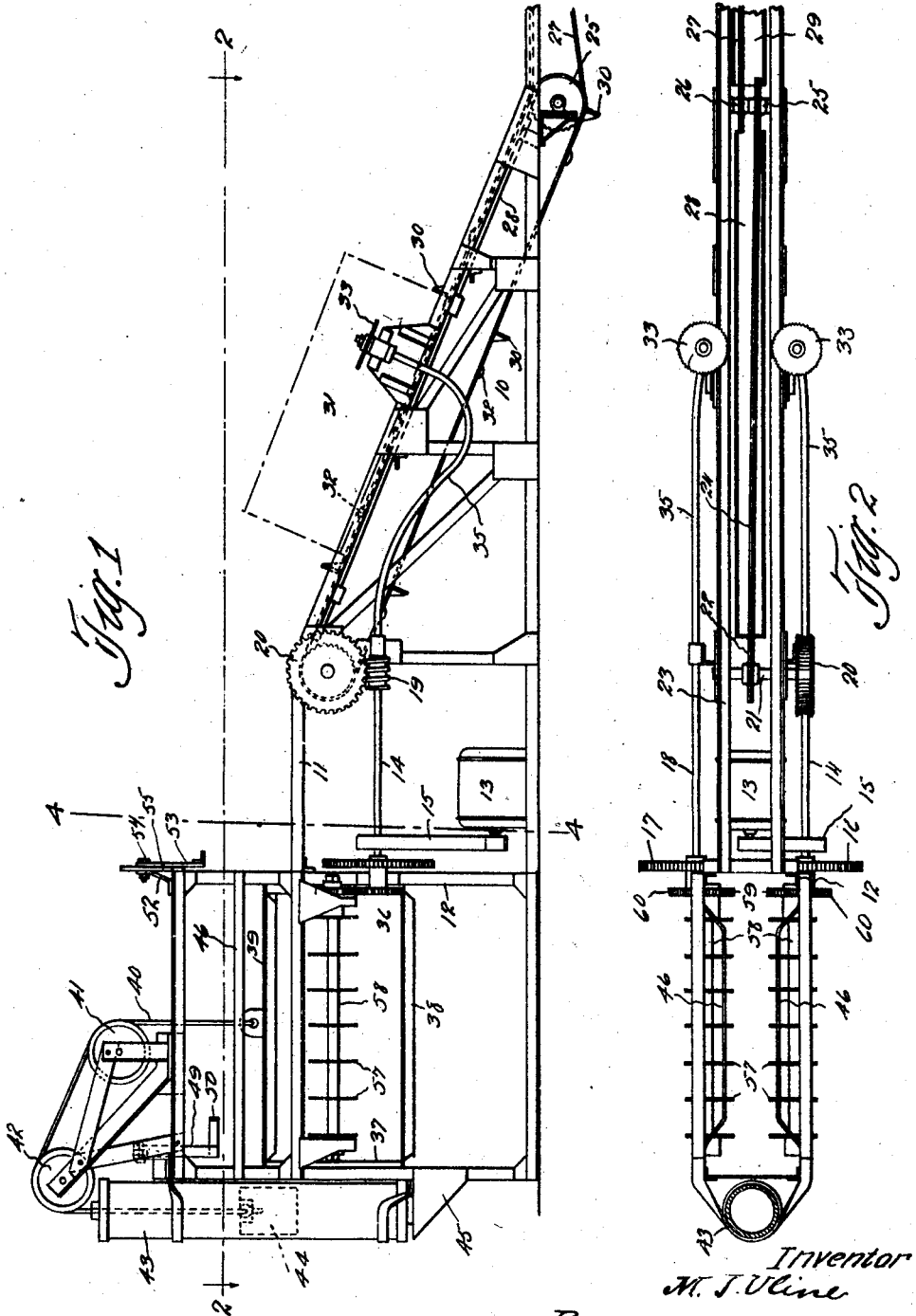

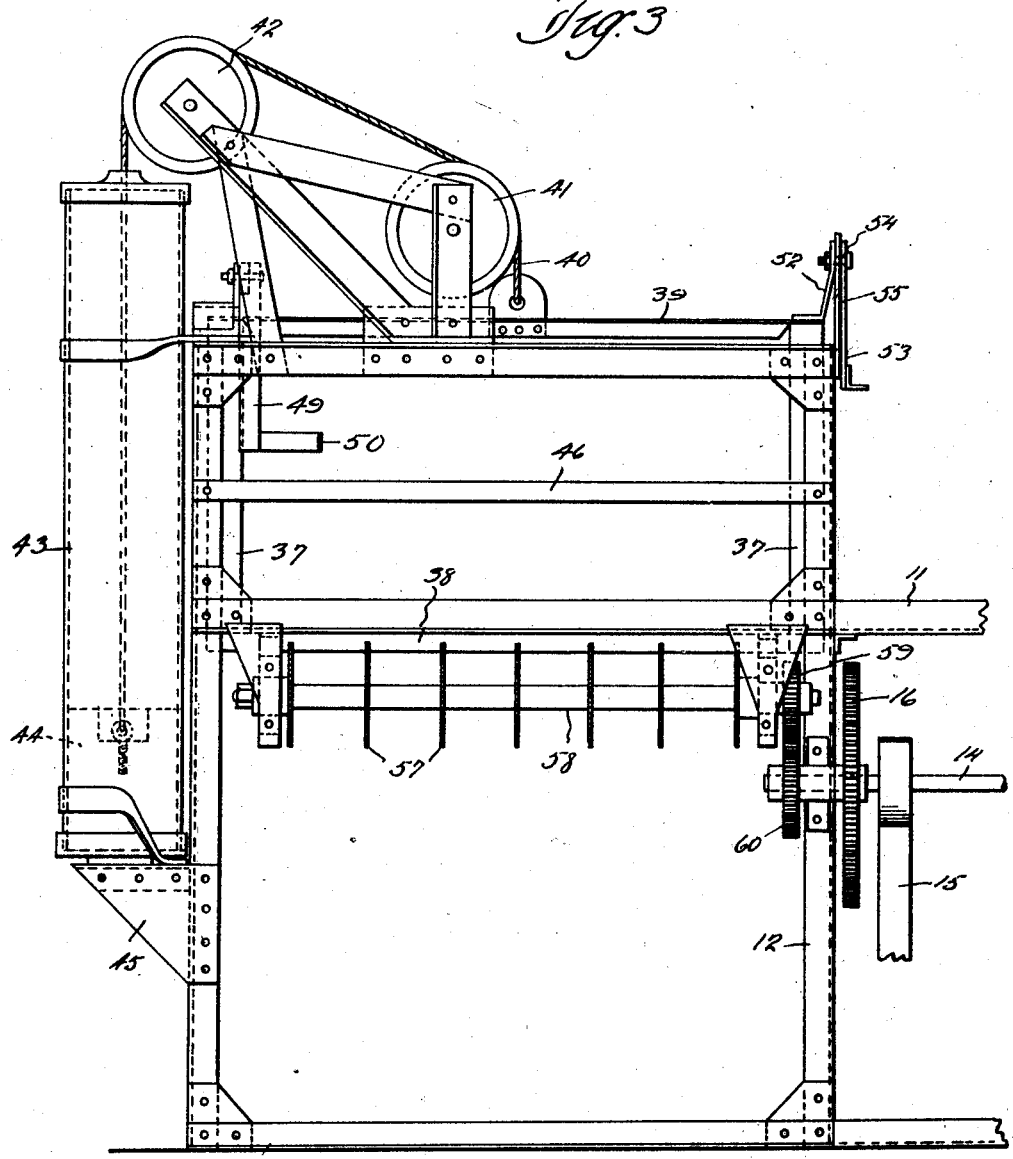

March 17, 1925. 1,529,972
M. J. ULINE
ICE SCORING MACHINE
Filed April 4, 1921   3 Sheets-Sheet 3
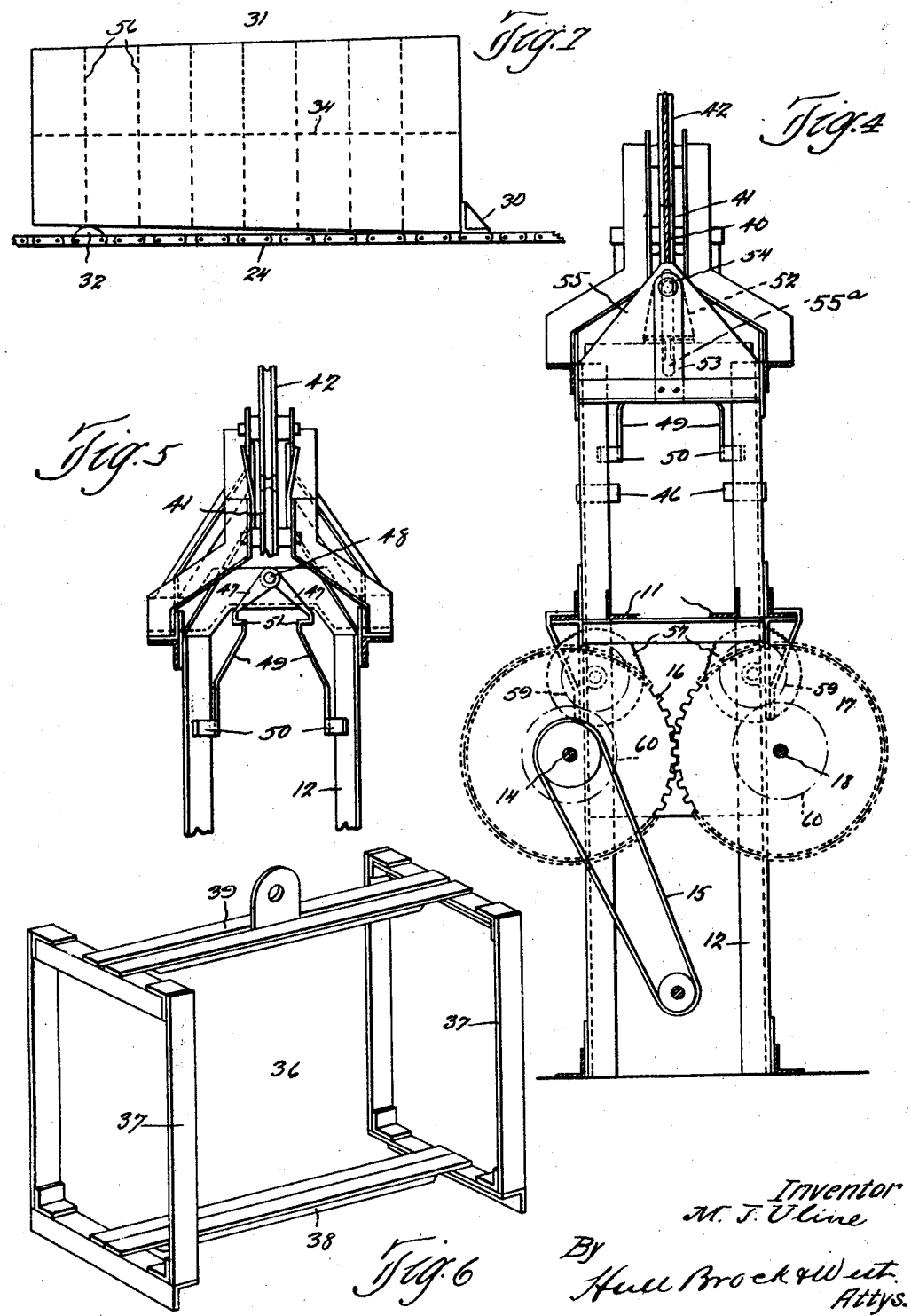

Patented Mar. 17, 1925.

1,529,972

UNITED STATES PATENT OFFICE.

MICHIEL J. ULINE, OF TOLEDO, OHIO, ASSIGNOR, BY MESNE ASSIGNMENTS, TO THE ULINE ICE-SCORING MACHINE COMPANY, OF WILMINGTON, DELAWARE, A CORPORATION OF DELAWARE.

ICE-SCORING MACHINE.

Application filed April 4, 1921. Serial No. 458,269.

*To all whom it may concern:*

Be it known that I, MICHIEL J. ULINE, a citizen of the United States, residing at Toledo, in the county of Lucas and State of Ohio, have invented a certain new and useful Improvement in Ice-Scoring Machines, of which the following is a full, clear, and exact description, reference being had to the accompanying drawings.

This invention is a novel construction of a device for scoring the sides of a cake of ice so that the said cake can be quickly and easily subdivided into accurate fractional portions thereof, and is in the nature of an improvement upon the apparatus disclosed in my application filed January 6, 1921, Serial No. 431,299.

The commercial cake of ice which is manufactured is usually wider and deeper at one end than at the other inasmuch as the pans in which the ice is made are so shaped in order to facilitate the removal of the cake from the pan.

In consequence these differences in dimensions must be taken into account in subdividing the blocks or cakes of ice and one of the objects of the present invention is to compensate for such differences in dimensions and produce the scores along the proper lines to provide for an accurate subdivision.

Another object of the invention is to provide for the simplification of the various operating parts and also to provide certain safety appliances whereby it will be impossible to improperly feed a cake of ice to the cage or cradle and whereby it would be impossible to feed such cake to the cage until the cage is in the proper and locked position ready to receive the same.

Another object is to provide a single source of power for driving all the moving parts.

With these various objects in view, the invention consists in the novel features of construction hereinafter fully described and pointed out in the claims.

In the drawings forming a part of this specification, Fig. 1 is a side elevation of one form of apparatus embodying my invention; Fig. 2 is a sectional plan view on the line 2—2 of Fig. 1; Fig. 3 is an enlarged side elevation of the rear end of the frame with the cradle arranged therein ready to receive the cake or block of ice; Fig. 4 is a transverse sectional view on the line 4—4 of Fig. 1; Fig. 5 is a detail sectional view illustrating the cage or cradle retaining and releasing device; Fig. 6 is a detail perspective view of the cage or cradle and Fig. 7 is a detail view showing a portion of elevating chain with a cake of ice arranged thereon, said chain being provided with means for compensating for the tapering shape of said block or cake.

In constructing my improved form of apparatus, I provide a suitable framework, preferably constructed of angle irons and comprising an inclined elevating portion 10, the horizontal platform portion 11 and a cage guiding portion 12, which is not only adapted to contain and guide the cage, but also carries the mechanism for holding and releasing the same, means for controlling the descent and returning said cage, and also the safety appliance for preventing the entry of a cake or block of ice until the cage is properly positioned to receive the same.

The various moving parts are so arranged and constructed that one motor 13 will be sufficient to operate the entire apparatus and in practice I prefer to transmit the power of this motor to a horizontal shaft 14 by means of a belt 15, the shaft 14 being journaled in bearings attached to the upright members of the frame and provided with a gear 16 which meshes with a similar gear 17 mounted upon the horizontal shaft 18 journaled upon the opposite side of the frame in a manner similar to the shaft 14.

The shaft 14 has a worm 19 mounted thereon which worm meshes with the gear 20 mounted upon the end of the shaft 21 journaled in the frame above the shafts 14 and 18, and having a sprocket wheel 22 mounted thereon midway between the parallel angle guide members 23, this sprocket wheel drives the elevating chain 24 in the direction indicated, said chain passing around the sprocket wheel 25 at its lower end, said wheel 25 being mounted upon the same shaft as the sprocket wheel 26 which operates the delivery sprocket chain 27.

The elevating sprocket chain travels in a channeled guide member 28 and the delivery chain travels in a channeled guide member 29, these channeled guide members 28 and 29 being centrally supported between the angle guide members 23. The delivery chain 27 and the elevating chain 24 have wings 30 connected thereto, said wings being so spaced as to receive the cake or block of ice 31 therebetween, the delivery chain delivering the cake or block of ice to the inclined guideway 23 and forcing the rear end thereof into proper position to be engaged by the wing 30, just as said wing begins its upward flight and inasmuch as the cake of ice is of tapering form I propose to feed the said cake along with the tapered end foremost and in order to compensate for the taper and provide an accurate scoring of the sides of the cake or block along the medial line I attach a compensating block or lug 32 to the link of the chain at the proper distance in advance of the cleat or wing 30 and this block or lug 32 may be detachably or permanently connected to the link of the chain, or if desired the link can be formed with a hump or enlargement and serve the same purpose; and it will of course be understood that the compensating block or lug will be of the proper height and so positioned or adjusted with reference to the length of the block and degree of taper as to elevate the forward end the required amount to provide for a scoring of the block or cake along the central longitudinal lines of the vertical sides thereof.

The scoring of the sides along the central longitudinal lines takes place as the block or cake is being carried up the incline and is accomplished by means of the rotary saws 33 journaled upon opposite sides of the inclined portion of the frame and so positioned as to overhang said inclined guideway so that as the block or cake of ice 31 is carried up it passes between said scoring saws, and being held in the proper elevated position by means of the compensating lug or block 32, a central longitudinal score 34 will be produced along each side of the block of ice.

The channeled guideway 28 in which the sprocket chain travels prevents any sagging of the chain, and holds the same in proper position to maintain said chain and compensating lug or block in their proper positions.

The scoring saws 33 are driven by flexible shafts 35, one flexible shaft being coupled to the end of the shaft 14 while the other flexible shaft is coupled to the end of the shaft 18. As the cake or block of ice is carried up the incline, the sides thereof are scored, and the block or cake of ice with the sides thereof scored is moved to the platform portion 11 of the frame, and if the cage is in its raised and locked position ready to receive the same as it passes into said cage and then the weight of the cake or block of ice causes said cage to descend between the vertical scoring saws for the purpose of producing the vertical scores in the side of the block or cake of ice.

The cage 36 is composed of the vertical end frames 37, the centrally disposed bottom bars 38 and the centrally disposed top bars 39, said top and bottom bars connecting the end frames 37 as most clearly shown in Fig. 6.

The cradle is of such size as to be easily movable up and down in the guide frame portion 12 and is guided between the angled uprights of which said frame portion is constructed. A cable 40 is attached centrally to the upper portion of the cage, said cable passing over the sheaves 41 and 42 and then into a cylinder 43 and connected at its opposite end to a weight 44 which moves up and down in the guiding cylinder 43, said cylinder being suitably supported upon a bracket 45 attached to the frame portions 12.

Guide rails 46 are provided at the proper heights for centering the block or cake of ice in the cage, these guide rails 46 being attached to the frame portion 12 as most clearly shown in Figs. 2, 3 and 4.

When the cage or cradle is in its raised position as shown in Fig. 3 and empty, it is held in such position by means of a combined stop and release device consisting of two arms 47, pivotally connected at their upper ends to a suitable bracket as shown at 48. These arms are arranged at the rear end of the frame and comprise the downwardly extending portions 49 and the horizontal diverging portions 50; and the downwardly extending portions 49 are shouldered at 51 to engage the top bars 39 of the cage and hold the same in raised position, the said arms being sprung out as the top bars of the cage move upwardly and these arms drop by gravity and automatically engage in shoulders 51 beneath the top bar 39 of the cage or cradle 36.

At the same time that the top bar 39 of the cage is engaging the combined locking and releasing device at the rear end of the frame, the forward end of said top bar is engaging the rearwardly projecting leg 52 of the safety plate 53, said plate and leg being connected by a bolt 54 passing through a bracket 55 which is slotted vertically at 55a to permit the bolt 54 to slide up and down therein, and when the cage is descending, the safety plate 53 will drop until the leg 52 contacts with the top of the frame 12 and this safety plate will extend sufficiently downwardly into the entrance to prevent a cake of ice passing through the frame opening, so that all danger of feeding a cake of ice until the cage is ready to receive the same, is entirely avoided.

When the safety plate is raised and the cage is locked as shown in Fig. 3, the cake of ice can be fed into said cage, the guide rails 46 causing the same to be properly centered, and as the cake passes toward the rear end of the cradle or cage the forward end of the cake will engage the diverging horizontal portions 50 of the pivoted arms and spread the same so as to disengage the shoulders 51 from the top bars 39 of the cage and the moment the arms are released the cage will immediately begin its descent inasmuch as said cake or block of ice is heavier than the counterbalance weight 44, and as the cage descends with the block or cake of ice, therein, the vertical scoring saws will produce the vertical score marks 56 in the opposite sides of the cake of ice, and it will be understood that any desired number of vertical scoring saws may be employed and properly spaced to subdivide the cake into any desired fractions.

The vertical scoring saws 57 are mounted upon the horizontal shafts 58 which are suitably journaled in the frame members 12 and each shaft 58 is provided with a gear 59 which in turn meshes with the gear 60, said gears 60 being mounted on the ends of the shafts 14 and 18 and one source of power, namely, the motor 13 will be utilized for delivering the cake of ice to the inclined guideway, move the said cake of ice up said guideway, score said cake as it moves up the inclined guideway by means of the inclined scoring saws which are also driven from the motor 13, and this same source of power is employed for driving the vertical scoring saws as the cage is carried down between them by the weight of the cake of ice.

When the cage reaches the bottom of the frame portion 12, the scoring operation has been completed and the cake is discharged from the cage, and the cage being relieved of its weight is immediately returned to its uppermost position by means of the counterbalance weight 44 and as the cage reaches the limit of its upward movement, it is automatically engaged by the locking device and at the same time the opposite end of the cage raises the stop plate 53 so as to clear the entrance ready for another cake of ice.

It will thus be seen that I provide a simple and efficient apparatus for scoring the opposite sides of a cake of ice both horizontally and vertically, and that I also provide for the accurate subdivision of such block or cake of ice, and also provide proper means for insuring the accurate and efficient operation of the device as a whole by the provision of suitable automatic safety, and locking, and releasing devices.

Having thus described my invention, what I claim is:

1. A device of the kind described comprising a vertically movable cage, a guiding appliance in which said cage moves, a gravity operated locking device connected to the guiding appliance and adapted to engage the upper portion of said cage, and a gravity operated stop device arranged upon the guiding appliance and movable upwardly by the engagement of the cage therewith.

2. In a machine of the kind described a feeding device for moving the tapered cake of ice, said feeding device being provided with means for maintaining the tapered cake with its side medial lines parallel with the feeding device in combination with scoring means for scoring the cake along such medial lines.

3. In a machine for scoring a tapered cake of ice, the combination with scoring means, of means for feeding the tapered cake of ice to the scoring device, said feeding device being provided with means for maintaining the tapered end of the cake so relatively positioned with reference to the feeding and scoring devices that the cake will be scored along its medial line, as it is fed between the scoring devices.

4. In a machine for scoring the sides of a tapered cake of ice, the combination with the oppositely disposed scoring devices, of means for feeding a cake of ice between said scoring devices, said feeding device being movable parallel with the plane of the scoring device and provided with means for maintaining the tapered cake of ice with its medial line relatively parallel with the feeding device whereby the cake is scored along its medial line as it is fed between the scoring device.

5. A device of the kind described comprising a frame consisting of a cage guiding portion, a platform and an elevating guideway, oppositely disposed saws arranged upon opposite sides of the elevating guideway, oppositely disposed saws mounted upon shafts attached to the guideway, a cage vertically movable in said guideway between the said saws, means for locking said cage at the limit of its upward movement, and means carried by said guiding frame to prevent the entrance of a cake of ice into the cage except when said cage is properly positioned and locked to receive the same.

6. In a device of the kind described, means for scoring tapered cakes of ice along the sides thereof and means for feeding said cakes between said scoring means, said feeding means maintaining each cake in such position during its passage that the scores will be along the medial lines of the sides.

In testimony whereof, I hereunto affix my signature.

MICHIEL J. ULINE.